(No Model.)

H. G. M. HOWARD.
TWO WHEELED VEHICLE.

No. 381,927. Patented May 1, 1888.

Witnesses.
John C. Perkins
Lyman L. Benson

Inventor.
Henry G. M. Howard
By Lucius C. West
Atty

UNITED STATES PATENT OFFICE.

HENRY G. M. HOWARD, OF KALAMAZOO, MICHIGAN.

TWO-WHEELED VEHICLE.

SPECIFICATION forming part of Letters Patent No. 381,927, dated May 1, 1888.

Application filed January 23, 1888. Serial No. 261,584. (No model.)

*To all whom it may concern:*

Be it known that I, HENRY G. M. HOWARD, a citizen of the United States, residing at Kalamazoo, county of Kalamazoo, State of Michigan, have invented a new and useful Two-Wheeled Vehicle, of which the following is a specification.

This invention has for its objects the construction of improved elastic supports for the fulcrumed body of a two-wheeled vehicle.

Figure 1:
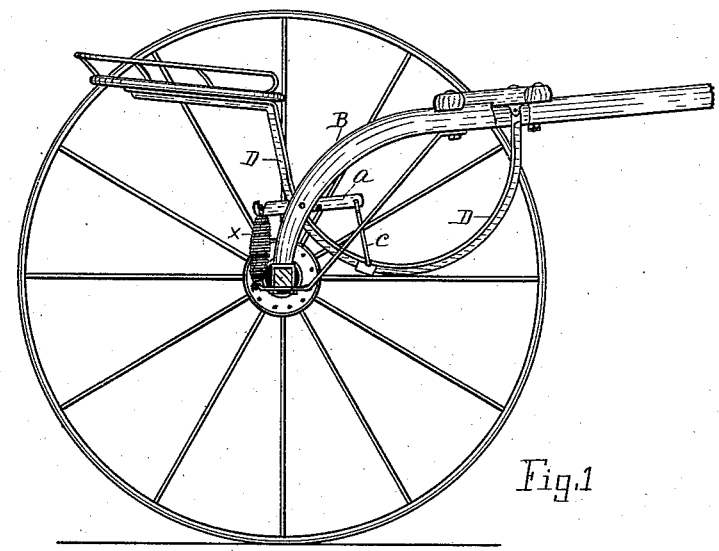
Figure 2:
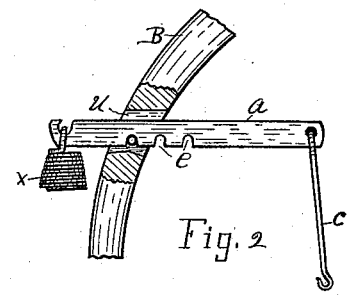
Figures 3, 4:
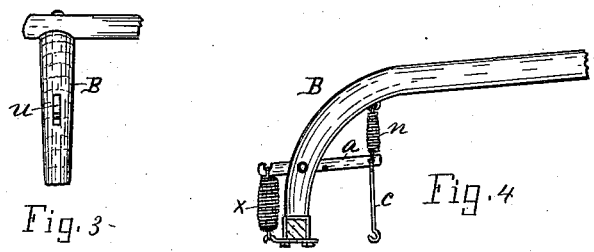

In the drawings forming a part of this specification, Figure 1 is a side elevation, one wheel being removed; Fig. 2, enlarged lettered details from Fig. 1, with part in section; Fig. 3, rear view of thill; and Fig. 4 shows lettered details from Fig. 1, showing a change in construction.

Referring to the lettered parts of the drawings, B is the thill and D the body fulcrumed thereto at the forward end, substantially as heretofore. Lever $a$—one on each side of the vehicle—is loosely passed through a slot, $u$, cut through the thill, and the lever is fulcrumed on a pin which passes transversely through said slot. The lever $a$ has notches $e$—one or more—on the under side, which detachably fit over the pin, Fig. 2. By moving the lever $a$ from one notch to another it changes the leverage on the spring $x$ to suit persons of different weight.

The spiral spring $x$ is attached at its lower end to the rear side of the axle or to some projection from the axle, Figs. 1 and 4, and is attached at the upper end to the rear end of the lever $a$.

The forward end of the lever $a$ is connected to the body or seat-bar by a pivoted hanger, $c$. Thus when the body swings down the lever $a$ rocks on its fulcrum and the spring $x$ is expanded.

The lever $a$ may be fulcrumed by the side of the thill, instead of passing through it, in any suitable manner. It is sometimes desirable to make the body rigid for speeding purposes. This is effected by sliding the lever $a$ as far to the rearward as possible through the slot, so as to bring the fulcrum as near the forward end as possible, in which case the leverage is not sufficient to act upon the spring—at least to any material extent.

In Fig. 4 the lever $a$ rocks on its fulcrum against a spring-resistance at each end. The spring $n$ is added in this figure, its upper end being attached to the thill and its lower end to the forward end of the lever. The springs in this instance are lighter.

It will be understood that both sides of the vehicle are like the side here shown.

Having thus described my invention, what I claim is—

1. The combination of the wheeled axle, thills having the slots with fulcrum-pins therein, the levers passed through the slot of the thills, a vehicle-body or seat-bars, and the hangers and springs, substantially as set forth.

2. The combination of the wheeled axle, body, the fulcrumed levers, the hangers attached at one end to the end of the levers and at the other end to the body, and the spiral springs attached to some suitable connection at one end and to the end of the fulcrumed levers at the other end, substantially as set forth.

3. The combination of a vehicle-body, wheeled axle, thills, the levers having the series of notches and fulcrumed in the slots through the thills, the hangers, and springs, substantially as set forth.

4. The combination of the wheeled axle, thills having the fulcrum-slots, the notched levers in said slots, the fulcrumed body or seat-bars, hangers attached to the body and to the front end of the levers, and spiral springs attached to a projection from the axle at the lower end and to the rear end of the levers at the upper end, substantially as set forth.

5. In a vehicle, the combination of the body fulcrumed at the forward end, the levers transversely to the axle and resting across a suitable fulcrum, said levers being jointedly attached to the body at their forward ends, and springs exerting a resistance against the rise of the rear end of the levers when their forward ends are borne downward, substantially as set forth.

6. In a vehicle, the combination of the body, thills, the fulcrumed levers, the hangers, and springs exerting a resistance against the movement of the levers at each end when the body is borne down, substantially as set forth.

In testimony of the foregoing I have hereunto subscribed my name in presence of two witnesses.

HENRY G. M. HOWARD.

Witnesses:
WILLIAM FRAZIER,
L. L. BENSON.